Jan. 6, 1970     H. I. PODELL     3,488,666
SELF-LOCKING SCREWS AND METHOD OF MANUFACTURE
Filed April 24, 1967     2 Sheets-Sheet 1
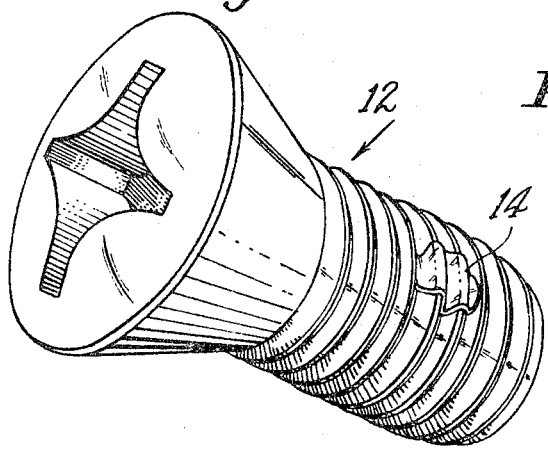
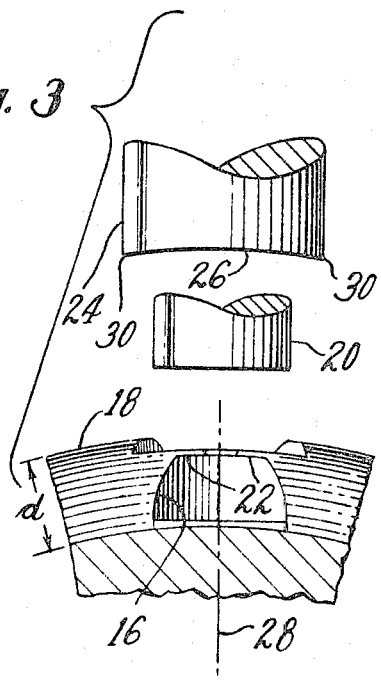
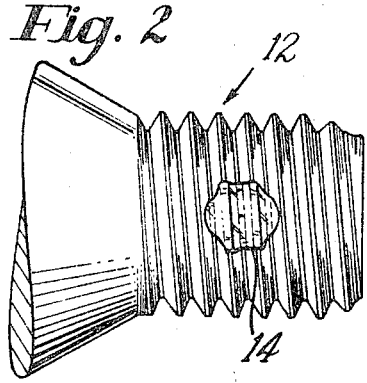
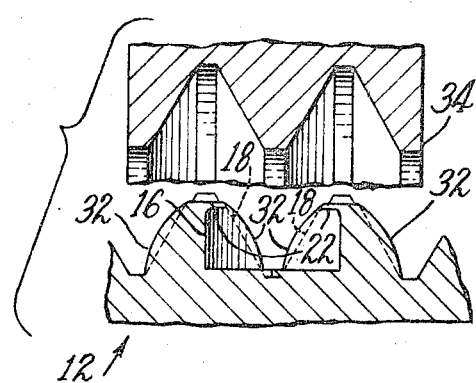
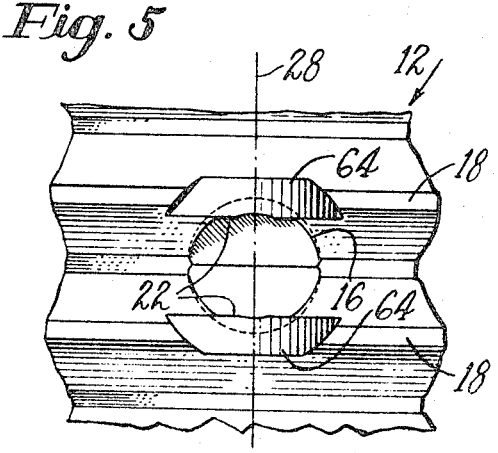
*Inventor*
Howard I. Podell
By his Attorney
Maurice R. Boiteau

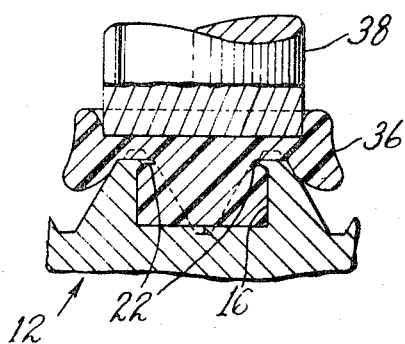
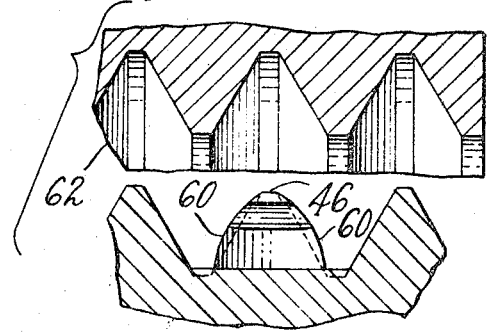
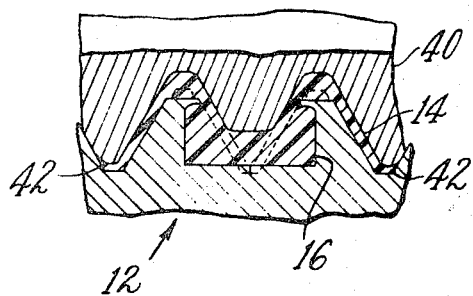
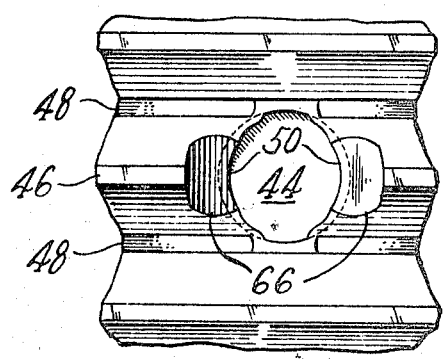
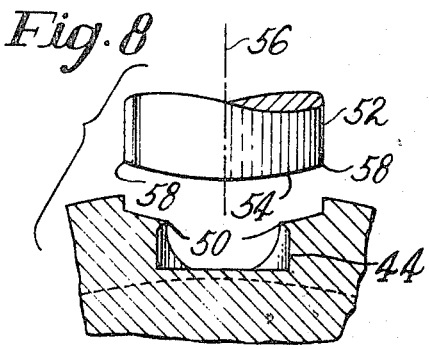

__

United States Patent Office 3,488,666
Patented Jan. 6, 1970

3,488,666
SELF-LOCKING SCREWS AND METHOD OF MANUFACTURE
Howard I. Podell, Larchmont, N.Y., assignor to United Shoe Machinery Corporation, Flemington, N.J., a corporation of New Jersey
Continuation-in-part of application Ser. No. 543,989, Apr. 20, 1966. This application Apr. 24, 1967, Ser. No. 636,568
Int. Cl. F16b *39/24*
U.S. Cl. 151—7                                            6 Claims

ABSTRACT OF THE DISCLOSURE

A self-locking threaded fastener of the plastic insert type in which the insert is relatively short in the direction of the axis of the fastener and is retained in a shallow coined cavity formed in the screw thread by a lip resulting from a second operation using a punch having a curved work engaging surface.

---

This invention relates generally to improvements in self-locking threaded fasteners in which locking action is obtained from a pellet of nylon or similar plastic material in the threaded portion of the fastener and more particularly to such fasteners in which the pellet is both shallow and relatively short in the direction of the axis of the thread. The present application is a continuation-in-part of my co-pending application for U.S. Letters Patent Ser. No. 543,989, filed Apr. 20, 1966 and later abandoned in favor of continuation application Ser. No. 718,016, filed Apr. 1, 1968.

Threaded fasteners in which a locking action against loosening is obtained by a pellet of nylon or similar material are well known. In one form of such fasteners the pellet is anchored in a relatively deep drilled cavity. In this type of fastener retention of the pellet which may be short in the axial direction of the fastener is obtained by frictional engagement of the pellet with the long walls of the cavity without requiring that the walls be especially formed to retain the pellet. But particularly when such fasteners are screws, they have several inherent disadvantages one of which is that the removal of material in drilling the hole tends to weaken the screw to a considerably greater extent than in the proportion that the area of the void in a given radial plane bears to the cross sectional area below the thread root. In terms of production rate there is also a serious disadvantage in that the drilling operation is a most time consuming one and hence is the most costly one of the several operations required to transform a standard fastener into a self-locking one by the addition of a plastic insert. In addition a radially thick plastic pellet provides a locking action against withdrawal which leaves something to be desired both on first and on repeated withdrawals.

In order to overcome the above disadvantages encountered in self-locking screws of the drilled cavity type, one expedient has been the use of a thin elongated strip anchored in an undercut milled slot the bottom of which does not penetrate below the root of the thread. The milling operation is expensive, however, and, because it involves the cutting away of material of the original screw, also tends to reduce the strength of the screw although to a lesser degree because the proportion of the cross section which is milled away is considerably less than in the drilled cavity type. My above identified co-pending application is directed to this specific problem of providing a shallow elongated cavity for anchoring the locking strip without cutting away any material from the original screw. In my co-pending application the locking strip is anchored in a shallow cavity produced by a first coining operation by a plurality of tangs facing inwardly toward the center of the strip and produced entirely without metal removal by a second coining operation.

While self-locking fasteners according to my co-pending application eliminate the loss of strength as a difficulty, fasteners which include an elongated locking strip present certain problems in installation in tapped holes. This difficulty arises because of the fact that intallation torque is increased by the engagement of the locking insert simultaneously with six or more thread turns of the mating member. Accordingly the torque required for driving the screw is the cumulative torque required to overcome the resistance to movement of the insert in all of the turns. The withdrawal torque is largely proportional to the amount of deformation of the locking insert as a result of axial forces applied to the insert by the bottoming of the screw either under its head or at its end. The withdrawal torque is also effected by the degree of containment provided for the locking insert against axial shifting on the screw. It will thus be seen that inherently an elongated locking strip, the longitudinal containment of which is extremely difficult, possesses inferior locking characteristics compared to a pellet of relatively short length along the axis of the screw, which is contained against axial shifting on the screw. However, self-locking fasteners including a locking strip such as those according to my co-pending application are useful for use with nuts to assure engagement of at least a part of the locking element with the nut which may be located at various positions along the length of the screw.

Heretofore screws of the plastic insert self-locking type have been considered but rejected for providing sealing plugs for pressurized fluid containers. Conventional plugs for this purpose are generally of the tapered pipe threaded type to assure an interference fit of the plug in the hole so as to bar passage of fluid by tightly fitted metal. Pipe plugs however, are often difficult to remove because of the interference fit, require sizeable openings, and also incur inherent difficulties in the tapping of the mating tapered threads and installation to an adequate interference fit of the threads all of which is both more time consuming and costly than when closure is obtained with improved self-locking screws according to the present invention.

A source of fluid leakage from pressurized containers in which threaded plugs are installed is a helical path following the threads, essentially a passage of the fluid along the allowance for fit between the members. A special difficulty is presented when an attempt is made to seal a pressurized container with a straight threaded screw including a locking element of the elongated strip type. Because of the length of the locking element, it is difficult to assure the uniformity of sealing of the strip in the interior undercut corners of the cavity into which the strip is received. Any resultant void provides a ready path for pressurized fluid between the locking element and seat and in effect the inclusion of a strip type locking element on a straight threaded screw reduces rather than enhances the barrier presented by the screw to the passage of pressurized fluid.

It is accordingly an object of the present invention to provide for the efficient anchoring in screws of relatively thin locking pellets which are also short in the direction of the screw axis.

It is a related object to provide for the reliable anchoring of thin axially short pellets by a structure which is adapted to being produced entirely by metal deforming or coining without the need for removing any of the metal of the original screw and hence weakening the resultant self-locking screw.

A more general object is to provide a self-locking screw structure and method of production adapted to reduce the cost of converting standard screws to the self-locking form.

A more particular object is to provide a self-locking screw of the plastic pellet locking element type, which affords a built in barrier to the passage of fluids under pressure.

The foregoing objects are achieved in accordance with the invention by a screw in which a locking pellet is installed in a coined, flat-bottomed cavity of generally but not necessarily circular cross section in which the pellet is securely retained by an anchoring or locking lip produced by a second coining operation performed with a curved-bottomed punch. When the cavity is so located that its end walls in an axial plane of the screw rise to a considerable relative height along the flanks of the thread, the punch for the second coining operation is of concave shape. On the other hand, when the cavity is so positioned on the screw that its end walls intersect the radial plane of the screw near the root of the thread and the end walls are accordingly relatively low, the punch for the second coining operation is of convex shape. The result of processing a screw with tools and by the method of the present invention is extended locking pellet anchoring lips which reliably retain a thin pellet usually limited in its thickness to less than the full depth of the thread and is characterized by a superior degree of achievement of the goals already set forth.

The objects and features and numerous advantages of the invention will appear from a detailed description of an illustrative embodiment of the invention taken in connection with the accompanying drawings:

FIG. 1 is a view in perspective of a screw including a plastic locking element in accordance with the present invention;

FIG. 2 is a fragmentary view in side elevation of the screw of FIG. 1;

FIG. 3 is a transverse schematic view partly in section showing the interior wall of a pellet receiving cavity, its intersection with the flank of a thread and a pellet retaining lip, together with tools required for coining the cavity and the lip;

FIG. 4 is a schematic view in longitudinal section of a screw after the cavity coining operation and prior to a thread re-forming operation together with the tool for thread re-forming;

FIG. 5 is a plan view of the pellet receiving cavity showing the extent of the pellet retaining lip at the edge of the cavity;

FIG. 6 is a view in longitudinal section showing the insertion of a plastic pellet in the coined cavity;

FIG. 7 is a view in longitudinal section showing the forming of thread surfaces on the pellet to convert it to the plastic locking element of FIG. 1;

FIG. 8 is a view similar in some respects to FIG. 3 but showing an alternative cavity location and the second coining operation being performed with a convex-bottomed punch;

FIG. 9 is a view similar to FIG. 4 showing the re-forming of the thread after the coining operation of FIG. 8; and FIG. 10 is a plan view similar to FIG. 5 showing the pellet receiving cavity and retaining lips produced by the methods illustrated in FIGS. 8 and 9.

Turning now to the drawings particularly FIGS. 1 and 2, there is shown a screw indicated generally at 12 in which there is visible on the surface a plastic locking element 14 according to the present invention. The locking element 14 is usually of nylon but may be of any other material having comparable properties of deformability, density and resiliency.

As has already been stated, the present invention relates to an improved article in which a shallow or thin locking element which is short along the axis of the screw is firmly and reliably held in place in a cavity by extended lips produced by a coining operation performed with a punch having a curved bottom. The punch may be either concave or convex depending upon the relative position of the ends of the cavity along the axis of the screw. If the ends of the cavity are at or near crests of the thread, a substantial advantage is obtained from using a concave lip forming punch. The use of a concave punch and the improved resulting screw will first be described with reference to FIGS. 3–7.

As seen in FIGS. 3–5 the screw 12 is formed with a cylindrical coined cavity 16 having a flat bottom located slightly above the root of a thread 18 having a depth $d$. The cavity 16 is produced by a first coining punch 20, shown schematically in FIG. 3, which is pressed into the thread to displace thread material. The cavity is thus created without removing any of the material of the screw and accordingly avoids locally weakening the screw. In this particular illustration, the diameter of the punch 20 and of the cavity 16 are substantially equal to the pitch of the thread, and are centered approximately at a point of intersection of an axial plane with the root of the thread. As a result, the cavity 16 intersects the thread 18 at its ends in the axial plane of the screw at two adjacent crests one on each side of the root about which the cavity is centered.

In order to provide for the secure anchoring of the locking element in the screw according to the present invention, a second coining operation is performed to produce locking lips 22. The second coining operation is performed with a lip coining punch 24 larger in diameter than the cavity coining punch 20 by 5 to 60% depending upon such factors as screw size, pitch and material of which the screw is made. The punch 24 is formed with a concave work engaging surface 26 according to an important feature of the invention so as to produce a pair of lips 22 of maximum extent at the outer edge of the cavity 16. The depth of penetration of the punch 26 into the crests of the threads will vary as will the diameter of the cavity 16 and of the punch 24. However, in processing a ¼–20 screw of mild steel in which the cavity is .050 in diameter, it has been found that a penetration by the punch 24 of approximately .006″ when the punch 24 is .075 in diameter, produces lips 22 of sufficient extent to hold the locking element 14 securely in place.

The benefits to be derived from the concave surface 26 of the punch 24 will be more fully appreciated by considering FIG. 5 in which an axial plane represented by a line 28 defines with the root of the thread the center of the cavity 16, of the first coining punch 20, and of the lip coining punch 24. The degree of improvement provided by the concavity of the surface 26 in extending the length of the lips 22 will best be understood by first considering the type of imprint which a flat punch would produce upon the crests of threads comparatively situated with respect to the cavity 16. Typically the radius of concavity of the work engaging surface 26 is equal to the body or nominal radius of the screw being processed. Thus, in operating upon a ¼–20 screw the concave surface 26 is that defined by a radius of ⅛″ about an axis parallel to the axis of the screw so that the punch 24 when lowered into contact with the screw 12 bears on the thread crests within its area.

Turning now to a consideration of the action of a flat bottom punch for producing locking lips, it will be appreciated that as such a punch is lowered into contact with the crests of the thread the first area of contact would be across the width of each crest along the line 28 as seen in FIGS. 3 and 5. With considerably more penetration of a flat bottomed punch, the length of the locking lips could be extended somewhat but in so doing the flanks of the threads contacted by the punch would be seriously deformed. A certain degree of flank deformation can be corrected and is even desirable as will later appear but the flank deformation which would result from a flat bottom lip forming punch in order to produce adequate locking lips would under many circumstances be so extreme that the deformation could not subsequently be fully corrected and the fit of the screw in a standard threaded opening would thereby be appreciably altered.

By contrast, substantial and varied advantages accrue from the concavity of the surface 26 in producing lips 22 of maximum extent with minimum penetration and within an acceptable and even advantageous degree of thread flank deformation. As the punch 24 first contacts the screw 12 the surface 26 is in immediate contact with the entire crest surface of both turns of the thread lying within the cross sectional area of the punch 24, the outer edges of the punch denoted by the reference character 30 in FIG. 3 lie over the root of the thread and accordingly do not contact the thread surfaces. A broad longitudinal stripe, approximately the central ⅔ of the width of the punch 24 as seen in FIG. 3 is however available to engage not only the crests but also the upper flanks of the threads around the cavity 16. As a result the surface 26 upon being pressed into the body of the screw 12 progressively engages not only the crest of the thread but also the upper flank of the thread at the ends of the cavity near the line 28 and thereby maximizes the size of the lips 22. Another advantage of the concave surface 26 is that material engaged by a penetrating surface tends to flow in a direction perpendicular to the surface. In the present instance the perpendicular direction increases in its angularity with respect to the original wall of the cavity 16 as the distance from the plane 28 increases. This factor also tends to improve the lip forming process.

As has already been indicated generally, a certain degree of bulging of the flanks of the thread is desirable. This will be seen from FIG. 4 in which material of the screw which has been displaced by the punch 20 in creating the cavity 16 and by the punch 24 in forming at least a part of the lip 22 has caused outward bulging or bowing of the flanks of the thread in the area adjacent the cavity 16 as shown at 32. A thread re-forming punch 34 corresponding to the tool 52 in my co-pending application but of a much shorter length commensurate with the area of thread deformation is pressed into engagement with the deforming flanks 32 in order to correct the local flank deformation. As the punch 34 is pressed into engagement with the flanks 32, the material of the screw flows partly into the cavity 16 and partly into an increase in the extent of the lips 22. It is thus seen that the local reforming of the thread flanks provides an added benefit of increasing the area and extent of locking lips.

Following the thread reforming operation a pellet 36 is pressed into the cavity 16 and compressed under the lip 22 by a punch 38 as seen in FIG. 6. The diameter of the pellet 36 is usually slightly greater than that of the punch 38 and the volume of the pellet is such that it not only fills the cavity 16 but also after subsequent operations covers a variable area of thread flank adjacent the cavity.

Following the insertion of the pellet 36, it is reformed to cause it to cover a broader area of the thread and to be sealed in general conformity with the thread surfaces adjacent the cavity 16 as shown in FIG. 7. The reforming of the pellet 36, which is thereby transformed into the locking element 14, is accomplished by a punch 40 similar to the punch 34 but greater in area and formed so as to allow the locking element 14 to project its locking distance beyond the adjacent metallic surfaces of the screw thread. The locking distance varies in accordance with the pitch of the thread between approximately .005 and .015 of an inch for threads of pitches between 50 and 10 to the inch. The locking thickness is measured in a direction normal to the adjacent flank crest or root of the thread and is greatest for the coarsest thread. It will also be appreciated from FIG. 7 that the punch 40 comes into metal to metal contact with the flanks of the screw thread outside the area of the locking element 14 and is further so formed that the edges of the locking element seal as shown at 42 to adjacent thread flanks near the roots. The seal 42 is important in providing a barrier to the passage of fluid as has already been indicated and will be further explained. Because the punch 40 comes into contact with the screw threads the longitudinal extent of the locking element 14 and the shape of the seal 42, depend on the factors of original thread configuration, of the size of the cavity 16 and of the recess caused by the punch 24 in forming the lips 22 and of the volume of the pellet 36. All of these factors are susceptible to extremely accurate control with ease and accordingly the resultant product is readily reproducible with a high degree of uniformity.

The screw processing methods and self-locking screws processed by the methods already described in detail in this specification have been of a type in which a relatively shallow cavity, less than the thread depth and having high end walls because of the intersection of the cavity with points on the flanks of the threads close to the crests are processed with a concave locking lip forming punch to coin relatively extended locking lips overhanging each end portion of the cavity. While this cavity location and locking lip configuration are preferred, it is sometimes necessary for various reasons to locate the pellet receiving cavity so that its ends are at or near the root of the thread and the end wall is accordingly either very limited or non-existant. In such a case the pellet may be securely retained in the cavity by the side walls of the cavity and by locking lips overhanging an extended length of the outer edge of the cavity. The pellet receiving cavity and locking structure together with the method of processing screws in which the locking pellet is retained by locking lips at the side wall of the cavity will be best understood from the description of FIGS. 8 to 10 inclusive in which a flat bottomed cavity 44 is shown having been coined by a punch similar to the coining punch 20. The cavity 44 is centered on the crest 46 of a thread and is approximately a pitch length in diameter. Therefore, its ends in an axial plane coincide generally with roots 48 and accordingly, the ends of the cavity 44 are defined by a very shallow wall. In these circumstances the anchoring of the locking element corresponding to that designated at 14 in FIGS. 1, 2 and 7 is obtained by extended locking lips 50 at the sides of the cavity. The locking lips 50 are produced by a coining operation accomplished with a punch 52 having a convex work engaging surface 54. The curvature of the work engaging surface of the punch 52 as in the case of the punch 24 lengthens the lip 50 along the upper edge of the cavity 44. The lengthening effect again will best be understood by considering the action of a flat punch of dimensions similar to those of the punch 52 being applied to form lips about the cavity 44. If the punch 52 were flat its first engagement would be with the crest 46 and thereafter as the flat bottom punch penetrated the crest, the locking lip would form along a very narrow band at the intersection of the cavity and the two flanks of the thread extending between the crests 46 and the roots 48. In order to obtain an adequate locking lip in this manner, it would be necessary to penetrate to such a depth with the lip coining punch that the flanks of the thread would be excessively deformed. Because the punch 52 is formed with the convex work engaging surface 54 however, the surface of the punch between its axis 56 and its edge 58 engages the line of intersection between the thread flanks and the cavity 44 at about the same time as the edge 58 engages the crest 46. Accordingly, for a given depth of punch penetration there is a much greater extent of lip 50 with the convex surface 54 than there would be were the work engaging surface on the punch 52, flat. It will be readily apparent that the extent of engagement of the surface 54 with a given thread will vary in accordance with the curvature of the surface 54. It has been found however that for operating on screws of the national coarse thread series in which the cavity is approximately equal to the pitch of the thread, the curvature of the surface 54 may usefully be that obtained by a radius equal to that of the body radius of the screw being operated upon and generated about an axis parallel to the axis of the screw while it is in coining position. To state the matter in another way the surface 54 of the punch 52 is cylindrical about an axis parallel to that of the screw.

As in the case of screws processed with the concave punch 24, the flanks of the thread as processed in FIG. 8 are bulged outwardly as seen at 60 in FIG. 9. For this reason the thread surfaces in the vicinity of the cavity 44 are reformed by a punch 62 generally similar to the punch 34. In the process the lip formation is enhanced as was explained with reference to the operation of the punch 34.

Following the reformation of the thread by the punch 62 the screw is further processed by having a pellet inserted into the cavity in which it is locked by the lips 50 and thereafter the pellet is formed in a manner comparable to that of the insert 14 on the screw 12 as shown in FIGS. 6 and 7.

The second coining operation with the punch 24 for forming the pellet locking lips 22 produces a pair of ledges 64 about the ends of the cavity 16 on the screw 12. Because the surface 26 of the punch 24 is concave the ledges 64 at the ends of the cavity 22 are convex and as a result the locking lips 22 are substantially lengthened. The convex shelf arrangement is appropriate for extending the locking lips whenever the ends of the pellet receiving cavity coincide with points of the thread at or near the crest. This condition might obtain not only when a cavity is approximately equal to the pitch length and centered at the root of the thread but may also occur for example if the cavity were equal to twice the pitch length and centered on a crest.

In cases such as that of the cavtiy 44 having ends coinciding generally with the root of the thread or the lower flank area, the convex punch employed generates two concave lateral shelves 66 which tend to extend the length of the lips 50 along the sides of the cavity and provide greater security of locking element anchoring.

Because of the relatively short axial length of the locking element in screws according to the present invention, the torque required for initial installation is advantageously low. On the other hand because the locking element is relatively thin being anchored in a cavity which is typically less than the thread depth, the material of the locking element particularly nylon is pre-compressed so that not only is the torque resistance to removal initially relatively high but the torque remains advantageously high after repeated removals. This will be seen from the results of tests in which maximum installation torque and removal torque on first removal and upon fifth removal are given in inch pounds in the table below. The sample was a ¼–20 class 3A steel screw and cadimum plated taken with a test nut of class 2B fit. The pellet receiving cavity was coined with a .050″ diameter punch centered at the root of the thread and pressed into the body of the screw to a depth of .030 inch. The lip forming punch was of a diameter of .075 with a concave tip and was pressed into the body of the screw to a depth of .006 inch. The pellet diameter was .093 inch and had a length of .040 inch. The results of maximum installation torque, and minimum first removal and fifth removal torque in inch pounds is given in the table below:

| Sample | Initial installation, maximum | First removal static, minimum | Fifth removal static, minimum |
|---|---|---|---|
| 1 | 15 | 13 | 9 |
| 2 | 18 | 15 | 12 |
| 3 | 15 | 12 | 10 |
| 4 | 14 | 13 | 11 |
| 5 | 13 | 11 | 9 |
| Average | 15.4 | 12 | 10.2 |

From the foregoing table it is seen that screws processed according to the method of the present invention are characterized by a durably tight engagement between the locking insert and the mating threaded part. Since the locking insert is also small in area and dependably retainable in the cavity, it is also useful as a reliable seal for pressurized fluids by presenting a pre-compacted localized barrier generally across a minimum of two threads to prevent the flow of pressurized fluid along the helix of the thread.

In the foregoing description of screws according to the present invention, the pellet receiving cavities have been shown and described as of circular cross section and the locking lips also shown and described as being produced by punches also of circular cross section. However, it will be appreciated that the present invention is not so limited in scope. For example, an improved product characterized by superior locking element retension is obtained whenever the pellet is received in a cavity which is relatively short along the axis of the screw and relatively shallow. For example the cavity, pellet and lip forming punch may be of a cross section in the form of a regular or irregular polygon or ovoid. Furthermore, although the examples given above are of external male threads, it can easily be seen that the advantages of the invention would accrue in female locking or sealing fasteners. It is accordingly intended that the foregoing description and accompanying drawings be taken not in a limiting but in an illustrative sense.

Having thus described my invention what I claim as new and desire to secure by Letters Patent of the United States is:

1. A self-locking screw comprising a threaded portion, a pellet disposed in a receiving cavity formed in the threaded portion, said cavity having walls generally perpendicular to the axis of the screw and terminating at its ends in the direction of the screw axis near screw thread crests and ridges having convex radially outer surfaces disposed at the ends of the cavity extending generally in the direction of the thread crest providing an extended length of anchoring lip overhanging the walls of the ends of the cavity and retaining the pellet against displacement.

2. A screw according to claim 1 further characterized in that the length of the cavity in the direction of the axis of the screw is no greater than three times the pitch of the thread.

3. A screw according to claim 2 further characterized in that the width of the cavity is approximately equal to its length.

4. A self-locking screw comprising a threaded portion, a pellet received in a cavity formed in the threaded portion, said cavity having walls generally perpendicular to the axis of the screw, and terminating at its ends in the direction of the screw axis near screw thread roots and generally axially extending ledges having concave radially outer surfaces at the sides of the cavity providing an extended length of anchoring lip over-hanging the side walls of the cavity and retaining the pellet against displacement.

5. A screw according to claim 4 further characterized in that the length of the cavity along the axis of the screw is no greater than three times the pitch of the thread.

6. A screw according to claim 5 further characterized in that the width of the cavity is approximately equal to its length.

References Cited

UNITED STATES PATENTS

| | | | |
|---|---|---|---|
| 2,539,887 | 1/1951 | Boots | 151—7 |
| 3,020,570 | 2/1962 | Wallace et al. | 151—7 |
| 3,182,702 | 5/1965 | Nason et al. | 151—7 |

OTHER REFERENCES

German printed applications, Ziehr, 1,097,395, Jan. 19, 1961.

EDWARD C. ALLEN, Primary Examiner